(12) United States Patent
Kuznetsov et al.

(10) Patent No.: US 9,652,469 B2
(45) Date of Patent: May 16, 2017

(54) CLUSTERED FILE SERVICE

(75) Inventors: Vyacheslav Kuznetsov, Sammamish, WA (US); Andrea D'Amato, Kirkland, WA (US); Alan Warwick, Bellevue, WA (US); Vladimir Petter, Bellevue, WA (US); Henry Aloysius, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/153,416

(22) Filed: Jun. 4, 2011

(65) Prior Publication Data
US 2012/0311003 A1 Dec. 6, 2012

(51) Int. Cl.
*G06F 17/30* (2006.01)

(52) U.S. Cl.
CPC .. *G06F 17/30165* (2013.01); *G06F 17/30174* (2013.01); *G06F 17/30203* (2013.01)

(58) Field of Classification Search
USPC ....................................................... 707/827
See application file for complete search history.

(56) References Cited

U.S. PATENT DOCUMENTS

| | | | |
|---|---|---|---|
| 5,394,555 A | 2/1995 | Hunter et al. | |
| 6,119,143 A | 9/2000 | Dias et al. | |
| 6,748,416 B2 | 6/2004 | Carpenter et al. | |
| 6,801,949 B1 | 10/2004 | Bruck et al. | |
| 6,865,597 B1 | 3/2005 | Bandopadhyay et al. | |
| 6,954,881 B1 | 10/2005 | Flynn, Jr. et al. | |
| 7,136,903 B1 | 11/2006 | Phillips et al. | |
| 7,496,565 B2 | 2/2009 | Thind et al. | |
| 7,506,009 B2 | 3/2009 | Singh et al. | |
| 7,525,902 B2 | 4/2009 | Dominic | |
| 7,577,688 B2 | 8/2009 | Goldick et al. | |
| 7,653,699 B1 | 1/2010 | Colgrove et al. | |
| 7,739,677 B1 | 6/2010 | Kekre et al. | |
| 7,885,930 B2 | 2/2011 | Anzai et al. | |
| 2002/0161855 A1 | 10/2002 | Manczak et al. | |
| 2005/0210084 A1 | 9/2005 | Goldick et al. | |
| 2005/0283658 A1 | 12/2005 | Clark et al. | |
| 2007/0055702 A1 | 3/2007 | Fridella et al. | |

(Continued)

OTHER PUBLICATIONS

Sadtler, Carla, "WebSphere Application Server V6.1: Technical Overview", Retrieved at <<http://www.redbooks.ibm.com/redpapers/pdfs/redp4191.pdf>>, Retrieved Date: Mar. 17, 2011, pp. 1-68.

(Continued)

*Primary Examiner* — William Spieler
(74) *Attorney, Agent, or Firm* — Workman Nydegger

(57) ABSTRACT

A cluster based file service may operate on a cluster of two or more independent devices that have access to a common data storage. The file service may have a namespace definition with each device in the cluster, but may be modified by any device operating the file service. Each instance of the file service may identify and capture a command that changes the namespace structure and cause the change to be propagated to the other members of cluster. If one of the devices in the cluster does not successfully perform an update to the namespace structure, that device may be brought offline. The cluster based file service may permit adding or removing devices from the cluster while the file service is operating, and may provide a high throughput and high availability file service.

20 Claims, 5 Drawing Sheets

(56) References Cited

U.S. PATENT DOCUMENTS

| | | |
|---|---|---|
| 2008/0005196 A1 | 1/2008 | Beck |
| 2008/0256607 A1 | 10/2008 | Janedittakarn et al. |
| 2009/0132552 A1 | 5/2009 | Adya et al. |
| 2009/0204705 A1 | 8/2009 | Marinov et al. |
| 2009/0282046 A1 | 11/2009 | Isaacson et al. |
| 2009/0327798 A1 | 12/2009 | D'Amato et al. |

OTHER PUBLICATIONS

"Using Microsoft Server Technology to Build Carrier Grade Call Centers", Jun. 2004, pp. 15.

Wang, et al., "Xenloop: A Transparent High Performance Inter-Vm Network Loopback", Retrieved at: http://osnet.cs.binghamton.edu/publications/wang08xenloop.pdf, Proceedings of the 17th international symposium on High performance distributed computing, vol. 12, Issue 02, Jun. 23-27, 2008, pp. 10.

Ekren, Steven, et al., "Innovating High Availability with Cluster Shared Volumes", 2009, pp. 44.

"Failover Clustering Performance Counters—Part 1", Sep. 4, 2009, pp. 4.

Schulman, Jerold, "The Microsoft Windows Cluster Service (MSCS) Clustering Model", Apr. 7, 2003, pp. 2.

"Cluster Shared Volumes (CSV): Disk Ownership", Mar. 1, 2009, pp. 4.

"Pomegranate—Storing Billions and Billions of Tiny Little Files", Retrieved at <<http://highscalability.com/blog/2010/8/30/pomegranate-storing-billions-and-billions-of-tiny-little-fil.html>>, Aug. 30, 2010, pp. 14.

"The Oracle Database Lite RDBMS", Retrieved at <<http://download.oracle.com/docs/cd/B19188_01/doc/B15920/nvdb.htm>>, Retrieved Date: Mar. 28, 2011, pp. 18.

"HDFS Architecture", Retrieved at <<http://hadoop.apache.org/common/docs/r0.20.2/hdfs_design.html>>, Retrieved Date: Mar. 28, 2011, pp. 7.

"International Search Report", Mailed Date: Dec. 14, 2012, Application No. PCT/US2012/039879, Filed Date: May 29, 2012, pp. 9.

"Office Action Issued in European Patent Application No. 12796591.1", Mailed date: Jun. 10, 2016, 6 Pages.

Radia, Sanjay, "Apache Hadoop India Summit 2011—HDFS Federation", Retrieved from: <<http://documents.mx/documents/apache-hadoop-india-summit-2011-keynote-talk-hdfs-federation-by-sanjay-radia.html>>, Feb. 28, 2011, 11 Pages.

"Second Office Action Issued in Chinese Patent Application No. 201280027196.2", Mailed Date: Feb. 22, 2016, 9 Pages.

"First Office Action and Search Report Issued in Chinese Patent Application No. 201280027196.2", Mailed Date: Jul. 2, 2015, 12 Pages.

"Supplementary Search Report issued in European Patent Application No. 12796591.1", Mailed Date: Jul. 14, 2015, 10 Pages.

CLUSTERED FILE SERVICE

CROSS REFERENCE TO RELATED APPLICATIONS

This application is related to U.S. patent application Ser. No. 13/153,399 entitled "DISTRIBUTED NETWORK NAME,", filed concurrently herewith.

BACKGROUND

File services operate to share files with various client devices. The file services may present files to client devices in the form of shares, which are directory structures or portions of directory structures in which files may be stored. In some cases, the same file may be made available in different shares.

Many file services may define different sets of permissions for different users for each share. Some users may have read/write permissions, while other users may have read only permissions and still other users may have no access to the share. Some file systems may apply different permissions to subsets of the share, such as defining different permissions for individual files, directories, or groups of files or directories within a single share.

SUMMARY

A cluster based file service may operate on a cluster of two or more independent devices that have access to a common data storage. The file service may have a namespace definition with each device in the cluster, but may be modified by any device operating the file service. Each instance of the file service may identify and capture a command that changes the namespace structure and cause the change to be propagated to the other members of cluster. If one of the devices in the cluster does not successfully perform an update to the namespace structure, that device may be brought offline. The cluster based file service may permit adding or removing devices from the cluster while the file service is operating, and may provide a high throughput and high availability file service.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
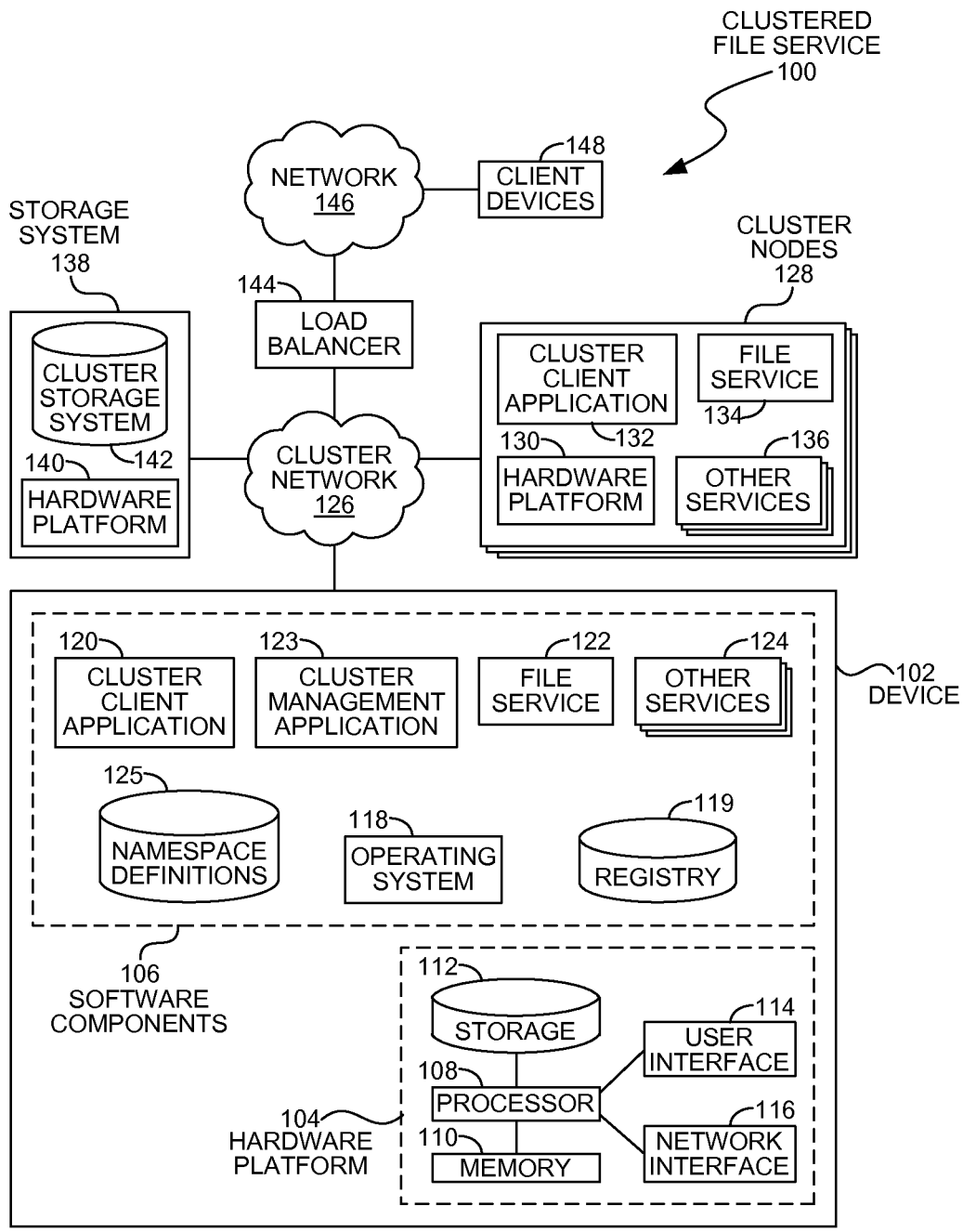
FIG. 1 is a diagram of an embodiment showing a network environment with clustered file service.

A cluster based file service may provide file services to multiple clients using multiple devices in parallel. Each of the file service providers may have identical copies of the file namespace, and may identify and capture changes to the namespace. Those changes may be propagated to each of the members of the cluster that provide the same file service.

The architecture of the cluster may allow several different namespaces to be provided by different groups of devices within the cluster. For example, one namespace may be served by three devices within a cluster, while a second namespace may be served by four devices, two of which may be members of the group providing the first namespace. In such embodiments, some devices in the cluster may serve two or more namespaces, while other devices may serve only one namespace.

The cluster may operate a group of devices using a leader and follower arrangement. A leader is defined as a device within the cluster that manages an application. In the case of a file service, the leader may be the device that starts and stops the file service, adds or removes additional cluster devices to the file service, and performs other administrative tasks.

Within the group of devices providing a file service, some embodiments may have each device may act as a master or slave, depending on the situation. When a device detects a change to the namespace, such as when a user adds or deletes a file, the device may operate as a master to update the namespace and transmit the namespace to the other devices, which act as slaves. Any of the devices may act as masters or slaves during the course of operation of the file system. Other embodiments may have different mechanisms for updating the other nodes within a cluster.

The namespace may identify any type of shared resource, which typically is a file system. The file system may include directory or folders, files, or other objects. In some embodiments, the namespace may be a pointer to a starting point within a directory structure. The namespace may include various permission settings or other information about the namespace.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100, showing a clustered file service. Embodiment 100 is an example architecture that may be used to provide file services in a highly parallel, fault tolerant system with high availability.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 is an example of a computer cluster where several computers may operate in parallel to provide various services, such as file services. A cluster may have several computers that execute the same application or service and may independently process requests for the application or service. Clustering may be one mechanism by which multiple computers may be arranged to provide a service for fault tolerance and/or high throughput.

In a cluster, two or more devices may process operations in parallel. In many cluster environments, the devices may be configured so that one of the devices may fail, be pulled offline, or otherwise stop operating yet the service may still be operating on another device. Such a configuration may be a failsafe system where the system may tolerate failure of one or more devices while still providing the service.

Further, a cluster may provide very high throughput by processing multiple requests for the service simultaneously. In such uses, a single cluster may provide many times the bandwidth or throughput of a single device.

For a file service, each node that provides the file service may use the same namespace definition. The namespace definition may define the contents of the share being served. The share may include various objects, such as files, directories, folders, or other objects.

Each request to the file service may fall into two categories: those requests that cause the share to change and those that do not. Requests that cause the share to change may include requests that add or delete files, change the file directory structure, or perform other operations. Requests that do not change the share may include reads to a file. In some embodiments, write operations performed on a file may be considered a change to the namespace while other embodiments may treat write operations as not changing the namespace.

When a request changes the namespace, the change may be propagated to all nodes that serve the share. When a change is being propagated, the other nodes may pause until the change is completed on that node prior to responding to any other requests. If a device detects that a change is not properly implemented, the device may take itself offline until the problem may be resolved.

The namespace may be shared amongst the nodes in several different manners. In one manner, each of the device's operating systems may have a registry in which various configuration settings or other information are stored. The namespace of the share being served may be stored in the registry. The registry may be a database used by the operating system or other applications that may be quickly and readily accessed. In some embodiments, a portion of the registry may be shared across several nodes. The shared portion of the registry may operate by detecting a change to the registry on one of the nodes and propagating the change to the other nodes that share the portion of the registry.

In another manner, the namespace may be stored in another database, such as a master namespace stored in a storage system, which may be the cluster storage system. In such a system, each node may maintain a local copy of the namespace. The local copy may be located in a registry or other database. In such an embodiment, a node that operates as a master node may cause the change to be propagated to the other nodes.

The cluster may be managed by a cluster management application, which may execute on one of the cluster nodes. The cluster management application may perform various administrative operations on the cluster, such as adding, removing, and configuring nodes, as well as launching and managing applications on the cluster. For the file service application, the cluster management application may identify the nodes on which the file service may execute, assign a leader node, and cause the leader node to configure and operate the file service on the assigned nodes.

The device 102 represents one node of a cluster. In many embodiments, a cluster may have many nodes, from a mere few to many tens, hundreds, or more nodes. The devices within the cluster are typically made up of a hardware platform 104 and various software components 106. The device 102 may be a server computer, but some embodiments may utilize desktop computers, game consoles, and even portable devices such as laptop computers, mobile telephones, or other devices.

The hardware platform 104 may include a processor 108, random access memory 110, and nonvolatile storage 112. The processor 108 may be a single microprocessor, multi-core processor, or a group of processors. The random access memory 110 may store executable code as well as data that may be immediately accessible to the processor 108, while the nonvolatile storage 112 may store executable code and data in a persistent state.

The hardware platform 104 may include various peripherals that make up a user interface 114. In some cases, the user interface peripherals may be monitors, keyboards, pointing devices, or other user interface peripherals. Some embodiments may not include such user interface peripherals.

The hardware platform 104 may also include a network interface 116. The network interface 116 may include hard-wired and wireless interfaces through which the device 102 may communicate with other devices.

The software components 106 may include an operating system 118 on which various applications may execute. In some embodiments, the operating system 118 may be a specialized operating system for cluster computing. Such operating systems may include various services, databases, or mechanisms that may be used to join devices together into a cluster. In other embodiments, the operating system may be a generic operating system on which various cluster applications are executed so that the device may operate as part of a cluster.

A cluster management application 123 may execute on the device 102. The cluster management application 123 may operate on just one or several nodes of a cluster. When the cluster management application 123 operates on just one node of a cluster, that node may be considered a head node or management node.

The cluster management application 123 may perform various management and administrative functions for the cluster. Such functions may include configuring the cluster, adding or removing nodes from the cluster, and starting and stopping applications on the cluster.

A cluster client application 120 may also execute on the device 102. The cluster client application 120 may allow the device 102 to join the cluster and respond to management operations from a cluster management application. In some embodiments, the cluster management application 123 and the cluster client application 120 may execute on the same device. Other embodiments may not be so configured.

Device 102 may include a file service 122 that may respond to file service requests from various client devices 148. The file service 122 may make a share available to the client devices 148, where the share may physically reside on a storage system 138.

In some embodiments, a set of namespace definitions 125 may reside on the device 102. The namespace definitions 125 may include metadata about the files stored in a share. In some embodiments, the metadata may include the directory structure and metadata for each file in the directory structure. The namespace definitions 125 may be sufficient to respond to some file service requests, such as requests for the names of files in a specific directory. In some cases, the namespace definitions 125 may be used to make calls to a cluster storage system 142 to retrieve file contents, to write information to a file, or perform other operations on the share.

In some embodiments, the namespace definitions 125 may include a pointer to a share's starting point in an existing directory structure. In such embodiments, the namespace definitions 125 may include various metadata, such as permission settings, access controls, or other metadata for the share.

In some embodiments, the namespace definitions 125 may reside in a database, which may be any type of data storage mechanism such as a relational database, file, table, or other mechanism. In some embodiments, the namespace definitions 125 may be stored in a registry 119 that may be a database used by the operating system 118.

The device 102 may execute various other applications and services 124 in addition to the file service 122. In many embodiments, a cluster may execute many applications and services, with each application or service having different sets of resources applied.

The cluster may consist of several nodes. Device 102 may be one of the nodes, while cluster nodes 128 may be additional nodes. Cluster nodes 128 may operate on a hardware platform 130 similar to the hardware platform 104 of device 102. Each of the cluster nodes 128 may include a cluster client application 132 that allows the node to operate within the cluster, along with a file service 134 and other services 136. Not shown on the cluster nodes 128 is set of namespace definitions that may be used by the file service 134 to process file service requests.

Each of the cluster nodes may be connected to each other through a cluster network 126. In some embodiments, the cluster network may be a separate local area network from a network 146 where the client devices 148 may operate. In such embodiments, the cluster network 146 may have a dedicated high speed network where cluster nodes may communicate with each other. In other embodiments, the cluster network 126 may be a wide area network, the Internet, or other network. In such embodiments, the cluster network 126 may or may not be optimized for cluster nodes to communicate with each other.

The cluster nodes may communicate with a storage system 138, which may have a hardware platform 140 on which a cluster storage system 142 may operate. The storage system 138 may be a storage area network or other system that provides storage that may be accessed by each of the cluster nodes.

When the cluster nodes are operating a file service, the shares may be stored on the storage system 138. Each node operating the file service may communicate with the storage system 138 to retrieve files, directories, or other objects associated with the namespace being served. In such a configuration, each node may access the same file, as opposed to having multiple copies of a file.

A cluster may be arranged with a load balancer 144. The load balancer 144 may distribute incoming requests to any of the various nodes that execute a specific file service. The load balancer may operate using any type of load balancing scheme. In one load balancing scheme, a load balancer 144 may assign a request to each node in succession. Such a scheme may be known as a round robin scheme. Other schemes may analyze the bandwidth or response times of each node and assign a new request using such data as criteria.

In a normal operation, a file service executing on a cluster may make a share available to various client devices 148. The client devices 148 may be any type of computer device that may access a share. The cluster may provide redundancy, where one node may be taken off line due to a failure, maintenance, or other reason, and another node may continue to operate. The cluster may also provide increased throughput, as many nodes may service requests in parallel. Such uses may provide a higher throughput than a single node may be able to perform on its own.

Figure 2:
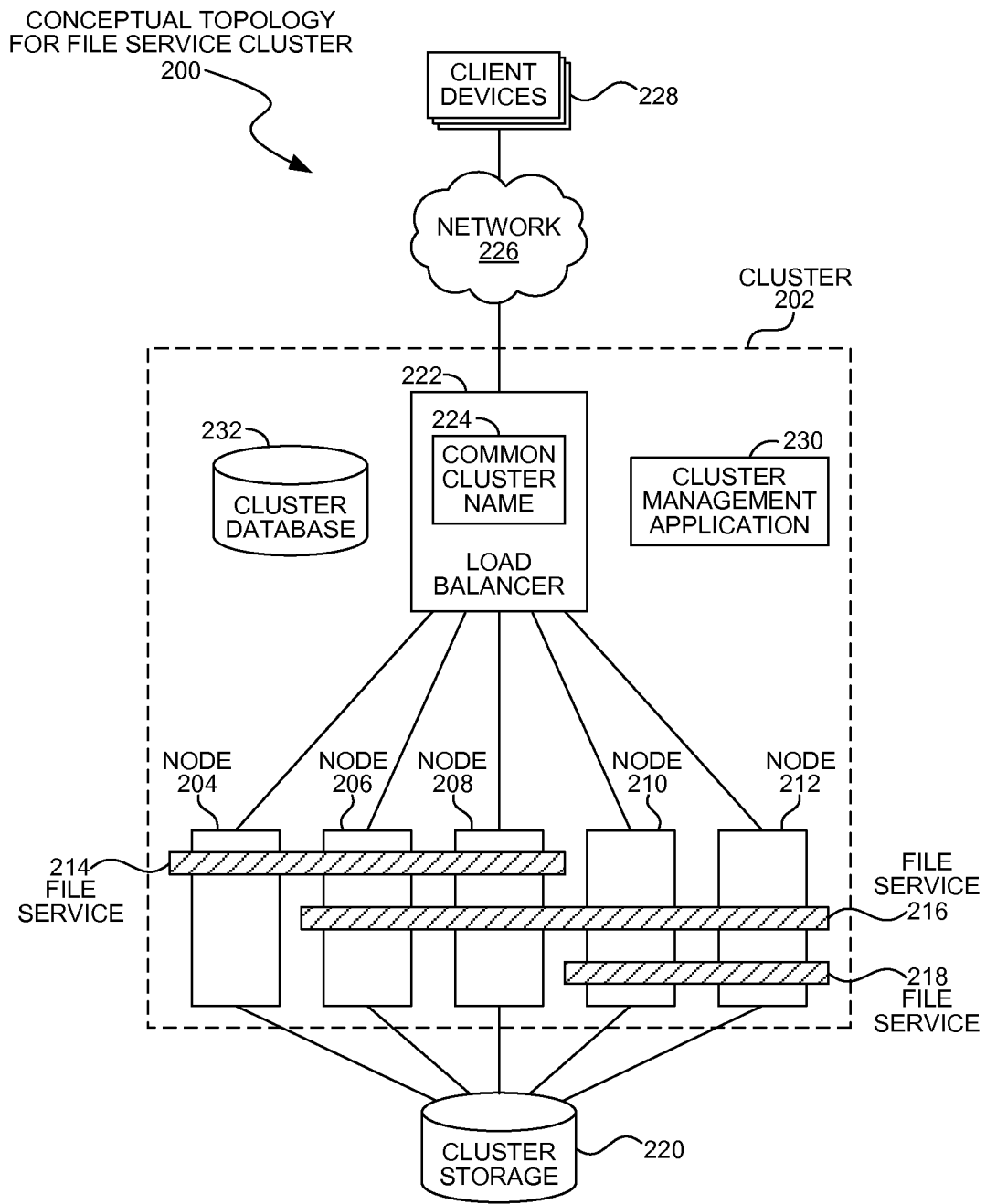
FIG. 2 is a functional diagram of an embodiment showing a conceptual topology for a file service cluster.

FIG. 2 is a diagram of an embodiment 200, showing a functional diagram of a clustered file service. Embodiment 200 is an example architecture that may be used to provide multiple file services across a cluster.

The diagram of FIG. 2 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 200 illustrates merely one example of a cluster on which three different file services may operate. Each of the file services may have a different resource allocation in that they may operate on different numbers of nodes. Further, each node may operate one, two, three, or more different file services.

The cluster 202 is illustrated as having five compute nodes 204, 206, 208, 210, and 212. Each of the compute nodes may be the computers that perform much of the processing for the various applications. There may be other nodes in the cluster, such as management nodes, storage nodes, load balancing nodes, proxy nodes, or additional compute nodes.

Three different file services are illustrated. A file service 214 may operate on nodes 204, 206, and 208. File service 216 may operate on nodes 206, 208, 210, and 212, while file service 218 may operate on nodes 210 and 212.

Each file service may operate as separate instances of a file service on their respective nodes. For example, node 208 may operate two instances of a file service. In such an embodiment, each instance may serve a different share and each instance may be operating on a different group of nodes.

In some embodiments, a single node may operate a single instance that may serve two or more shares. In such an embodiment, node 208 may, for example, execute a single instance of a file service that may respond to requests for the shares associated with file service 216 and file service 218.

In the example of embodiment 200, some nodes may be loaded differently than others. For example, node 204 may only have one file service 214, while node 206 may have two file services 214 and 216. Such situations may occur when a file service or other application is initially configured. During the configuration, the number of nodes to meet an anticipated demand may be determined and the nodes may be selected. The nodes may be selected using various criteria, including selecting the nodes based on lowest usage, random assignment, or other selection criteria.

In some embodiments, the nodes may not be identical. Some nodes may have more processing power, network bandwidth, or other capabilities than other nodes and therefore may support more instances of a file service.

Unequal loading for nodes may occur as a result of adding or removing nodes after a service is executing. Some embodiments may identify an increased loading for a service and may be able to add new nodes to the service to respond to additional requests. Similarly, some embodiments may identify that the loading for a service has decreased and may be able to remove some nodes from a service. After several different services add or remove nodes, an unbalanced or unequal condition may occur, such as the one illustrated in embodiment 200.

Each of the various nodes may connect to cluster storage 220. The cluster storage 220 may contain files, directories, and other items in a share that are accessed by any node providing a file service for the share. In many embodiments, the cluster storage 220 may be a storage area network or other storage system that may have the capacity, speed, or other performance parameters to respond to the various nodes providing the file service.

In some embodiments, some nodes may be directly connected to the cluster storage 220 while other nodes may only be indirectly connected. In such embodiments, the indirectly connected nodes may access the cluster storage 220 by communicating with a directly connected node using the cluster network.

Some clusters may have a load balancer 222. The load balancer 222 may assign new file system requests to the various nodes. The load balancer 222 may have various algorithms that spread the processing load amongst the various compute nodes. A simple algorithm may be a round robin algorithm that may assign requests to each node in sequence. A more elaborate algorithm may examine the nodes to determine which node may be the least loaded, and the algorithm may assign a new request to that node.

A load balancer 222 may include a common cluster name 224 that a client device 228 may use to address the cluster 202 over the network 226. The common cluster name 224 may be a single network name that may represent the entire cluster. When a client device 228 generates a file service request, the client device 228 may transmit the request to the common cluster name 224. From the client device's perspective, the file service may be provided by a single device, even though the file service may actually be provided by any one of a number of devices within the cluster. In such embodiments, the cluster 202 may appear on the network 226 as a single device.

The cluster 202 may include a cluster management application 230 that may perform various administrative tasks on the cluster. The cluster management application 230 may operate on one or more of the nodes of a cluster. In some embodiments, a dedicated management node may execute the cluster management application 230.

Each of the compute nodes 202, 204, 206, 208, and 210 may access a cluster database 232, which may contain namespaces for each of the various file services. The cluster database 232 may be implemented in several different manners.

In one manner, the cluster database 232 may contain a master copy of a namespace definition. The master copy may be synchronized or copied to each of the nodes that serve the corresponding file service.

In another manner, the cluster database 232 may again contain the namespace definition and each node that serves the file service may link to the cluster database. In such embodiments, a node may have a redirection or other link that causes a local call within the node to be directed to the cluster database. Such embodiments may not maintain a local copy of the cluster database at each node.

Figure 3:
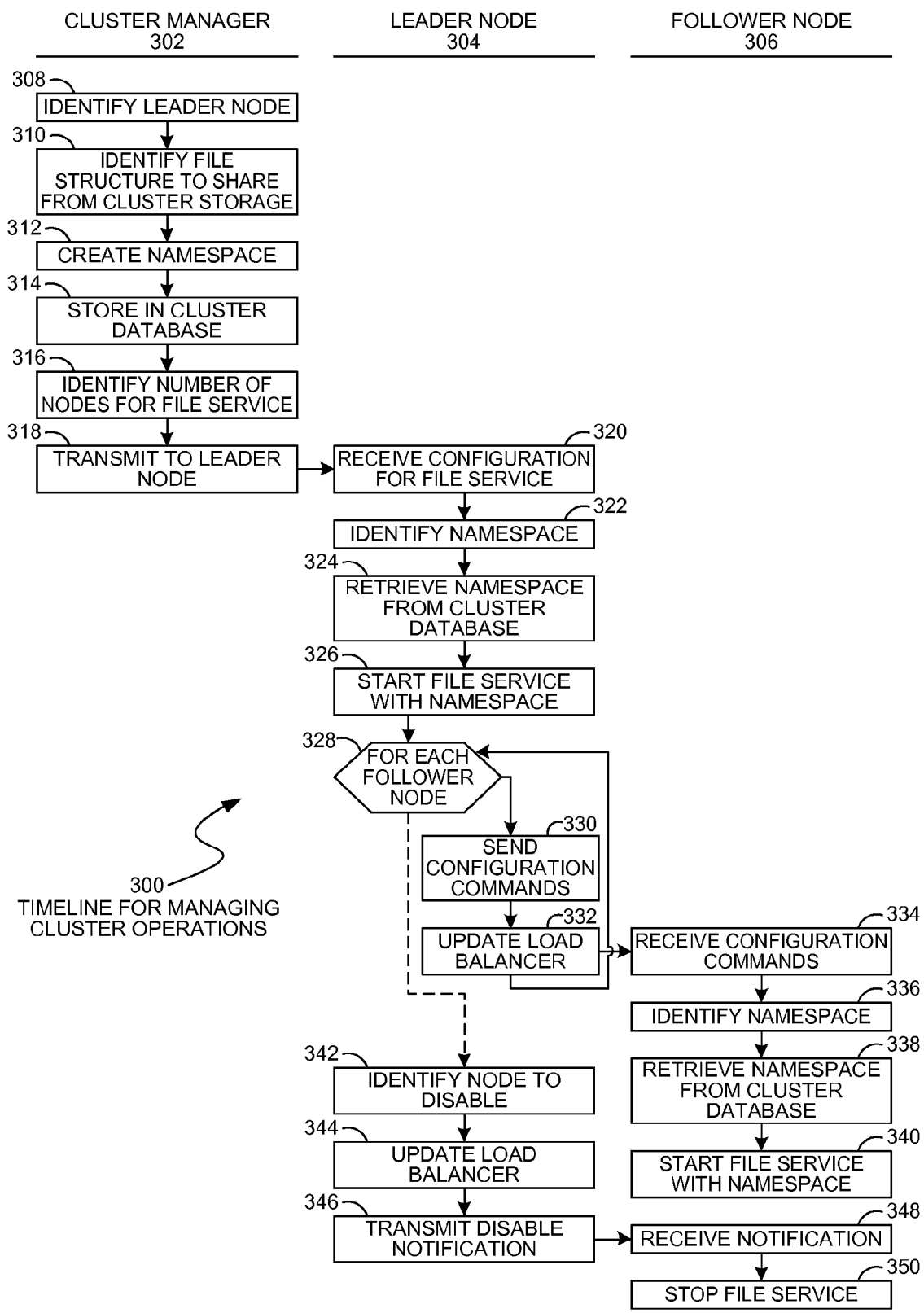
FIG. 3 is a timeline flowchart of an embodiment showing a method for managing cluster operations.

FIG. 3 is a timeline illustration of an embodiment 300 showing a method for managing cluster operations. Embodiment 300 is a simplified example of a method that may be performed by cluster manager 302, a leader node 304, and a follower node 306. The operations of the cluster manager 302 are illustrated in the left hand column, while the operations of the leader node 304 are illustrated in the center column and the operations of a follower node 306 are illustrated in the right hand column.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 illustrates an embodiment that uses a 'leader' and 'follower' model. A leader may be the first node that implements a service and may manage additional nodes, called follower nodes. A cluster manager may communicate with the leader to start, stop, and perform other management activities for a service. The leader may communicate with the various followers to execute those management activities.

In block 308, the leader node may be identified. The leader node may be the same configuration as other nodes in the cluster, but may manage a particular service.

A file structure to share from the cluster storage may be identified in block 310 and a corresponding namespace may be defined in block 312. The namespace may be stored in a cluster database in block 314.

The number of nodes that may execute the file service may be determined in block 316, and the file service configuration may be transmitted to the leader node in block 318.

The leader node 304 may receive the configuration in block 320 and begin the configuration process.

In block 322, the leader node 304 may identify the namespace and may retrieve the namespace in block 324 from the cluster database. In block 326, the file service may be started using the namespace. At this point, the leader node 304 may be the only node providing the file service.

In block 328, each follower node may be processed. In many embodiments, there may be multiple follower nodes, each of which may provide the file service using the namespace. The leader node 304 may transmit configuration commands in block 330 to the follower node 306, and may update a load balancer in block 332 with the follower node information.

The follower node 306 may receive the configuration commands in block 334. The follower node 306 may identify the namespace in block 336, retrieve the namespace definition from the cluster database in block 338, and may start the file service with the namespace in block 340.

The process of blocks 328 through 340 may be performed each time a new follower node is added to the file service.

In block 342, a node may be identified to disable or remove from the file service. The load balancer may be updated in block 344 so that the load balancer may stop sending new requests to the soon-to-be disabled node. The leader node 304 may transmit a disable notification in block 346 to the follower node 306, which may receive the notification in block 348 and stop the file service in block 350.

Embodiment 300 illustrates one method by which a file service may be started, then expanded to other follower nodes or contracted by removing follower nodes.

Figure 4:
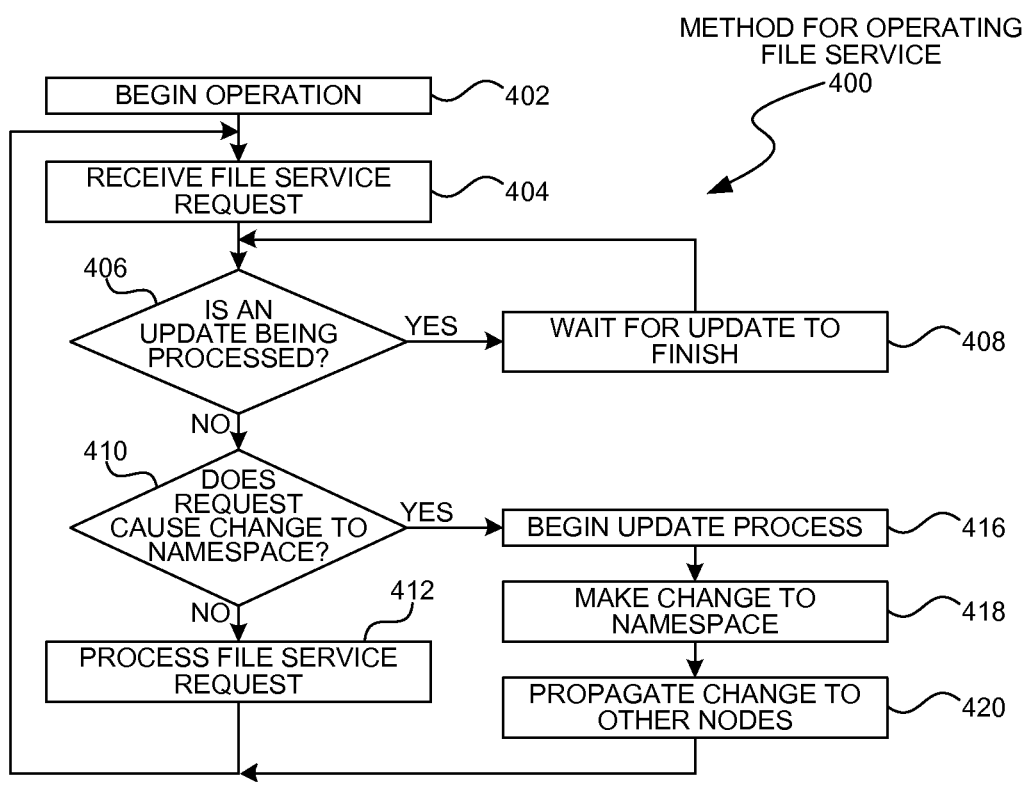
FIG. 4 is a flowchart of an embodiment showing a method for operating a file service.

FIG. 4 is a flowchart illustration of an embodiment 400 showing a method for operating a file service. Embodiment 400 is a simplified example of a method that may be performed by any node executing a file service, and is an example of an operation that may be performed when changes are made to a namespace.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 illustrates an example of a method that may be performed when a change may be made to the namespace. Embodiment 400 illustrates a method by which a node detects that a change is made to the namespace, then propagates the changes to other nodes.

Other embodiments may implement such updates using a master-slave operation within a file service. In such an embodiment, any node executing a file service may turn into a master node when that node detects that a request may cause a change to the namespace or some other condition where the data in the cluster database will be modified. A consistent cluster database is used by all the nodes so that each file service request is consistent, regardless of which node services the request.

The master-slave embodiments may operate by detecting that a request may change the information in the cluster database, and the node may set itself as master and cause the other nodes to operate as slaves until the change is propagated to each node.

In such embodiments, any node operating the file service may declare itself to be master at any time. In such an embodiment, every node may be capable of handling any type of request. Such embodiments may permit only one node to be master at any given time.

In block 402, the file service may begin operation.

In block 404, a file service request may be received. If an update is being processed in block 406, the node may wait until the update has finished in block 408 prior to continuing. The loop of block 408 may ensure that no request is processed using an out of date or inconsistent database. An example of a process performed during the update may be illustrated in embodiment 500 presented later in this specification.

If no updates are being processed in block 406, and the request does not cause a change to the namespace in block 410, the file service request may be processed in block 412.

If the request does cause a change in block 412, the update process may begin in block 416. The change may be made to the namespace in block 418 and the change may be propagated to the other nodes in block 420. The change may be stored locally in a local storage or cache.

Figure 5:
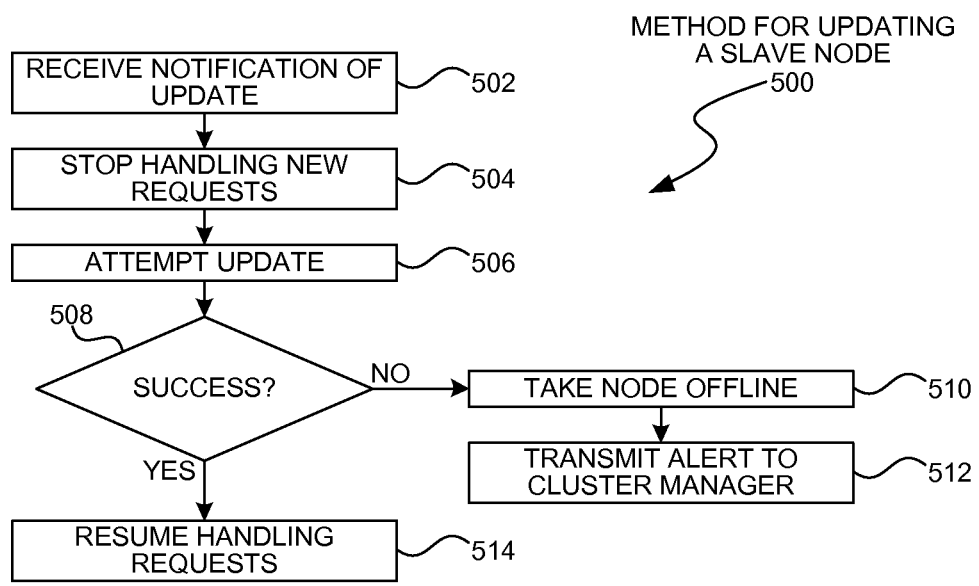
FIG. 5 is a flowchart of an embodiment showing a method for updating a slave node.

FIG. 5 is a flowchart illustration of an embodiment 500 showing a method for updating a slave device. Embodiment 500 is a simplified example of a method that may be performed by any node operating as a slave device during an update by a master device. In many embodiments, any device may operate as a slave or a master throughout the time the file service is executing.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 500 is a simplified example of the operations that may be performed by a slave device while a master device is causing a change to the namespace to be propagated.

In block 502, a notification of an update may be received. New file service requests may be stopped from being handled in block 504.

An attempt at updating the namespace definition or other information may be made in block 506. If the update is a success in block 508, the slave may resume handling requests in block 514.

If the update is not a success in block 508, the node may be taken offline in block 510 and an alert may be transmitted to a cluster manager or leader node in block 512.

The operations of embodiment 500 illustrate that when a slave node attempts to update and encounters a failure, the node may take itself offline. When the node is offline, corrective action may be taken while leaving the remaining nodes to continue operating.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A system comprising:
a plurality of devices, each of said devices having a file service operable on each of said plurality of devices;
a data store comprising files, said data store being accessible to each of said plurality of devices;
a namespace definition defining an organization for said files into a share, said namespace definition being stored in a cluster database on a master node accessible to each of said plurality of devices, said share being made available to client devices, the namespace definition, in addition to defining the organization, also defines which files are to be included within the share;
said file service that identifies changes to said namespace definition and updates said namespace definition on said cluster database on said master node to an updated namespace definition on said cluster database on the master node, said file service further updates a locally cached version of said namespace definition on at least one of the plurality of devices.

2. The system of claim 1 further comprising:
a load balancer that receives requests from said client devices and, for each of said requests, determining one of said plurality of devices to process a request.

3. The system of claim 2 wherein the load balancer includes a common cluster name that the client devices may use to address the cluster database.

4. The system of claim 2 wherein the load balancer is configured to determine that one of the plurality of devices will soon be disabled, and does not forward any further requests to that one of the plurality of devices.

5. The system of claim 1 further comprising:
a leader application executing on a first device of said plurality of devices, said leader application that identifies a new device and adds said new device to said plurality of devices.

6. The system of claim 5, said leader application that further identifies a first device and removes said first device from said plurality of devices.

7. The system of claim 1 further comprising:
a second plurality of devices being a subset of said plurality of devices; and
a second namespace definition defining a second organization for at least a subset of said files into a second share, said second namespace definition being stored said a cluster database accessible to each of said second plurality of devices, said second share being made available to client devices.

8. The system of claim 7, said second plurality of devices being the same as said plurality of devices.

9. The system of claim 1, said file service that further:
detects a failure when attempting to update said locally-cached version of said namespace definition for a first device and disables said file service for said first device.

10. The system of claim 9, said file service that further:
retries updating said locally cached version of said namespace definition and adds said first device to said plurality of devices when said updating is successful.

11. The system of claim 1, wherein updating by the file service the locally cached version of the namespace definition on the at least one of the plurality of devices includes:
detecting, by the file service, a failure when the at least one of the plurality of devices attempts to update the locally cached version of the namespace definition.

12. The system of claim 11, wherein the file service, after detecting the failure, causes the at least one of the plurality of devices to disable the locally cached version of the namespace definition.

13. The system of claim 11, wherein the file service, after detecting the failure, causes the at least one of the plurality of devices to retry to update the locally cached version of the namespace definition.

14. The system of claim 1, wherein a first instance of the file service operates on a first group of nodes to service a first request, wherein a second instance of the file service operates on a second group of nodes to service a second request, and wherein a particular node belonging to the first group of nodes also belongs to the second group of nodes such that the particular node is usable to service both the first request and the second request.

15. A method comprising:
defining a namespace definition for an organization for a data store comprising a plurality of files accessible by a plurality of devices, the namespace definition, in addition to defining the organization, also defines which files are to be included within the data store;
storing, in a cluster database on a master node that is accessible to each of the plurality of devices, the namespace definition;
identifying, with a files service, changes to the namespace definition;
updating the namespace definition on the cluster database on the master node to an updated namespace definition in response to an identified change to the namespace definition; and updating by the file service a locally cached version of the namespace definition on at least one of the plurality of devices.

16. The method of claim 15 further comprising:

receiving at least one request from a client device;

determining one of the plurality of devices to process the at least one request; and processing the at least one request on the determined one of the plurality of devices.

17. The method of claim 16 further comprising:

determining that one of the plurality of devices will soon be disabled; and blocking further requests to that one of the plurality of devices.

18. The method of claim 15 further comprising:

identifying by a leader application executing on a first device of the plurality of devices, that a new device that has been added; and adding the new device to the plurality of devices.

19. The method of claim 18 further comprising:

detecting a failure when updating a locally cached version of the namespace definition on one of the plurality of devices; and disabling the file service for the one of the plurality of devices.

20. The method of claim 19 further comprising:

retrying the update of the locally cached version of the namespace definition;

adding the one of the plurality of devices back to the plurality of devices when the retrying the update is successful.

* * * * *